Jan. 4, 1966  E. J. MOUTON  3,227,069

SLICED FRUIT SQUEEZER

Filed Sept. 16, 1964

INVENTOR.
ELMO J. MOUTON
BY William E. Kinnear
ATTORNEY

United States Patent Office 3,227,069
Patented Jan. 4, 1966

3,227,069
SLICED FRUIT SQUEEZER
Elmo J. Mouton, 5660 Azalea, Beaumont, Tex.
Filed Sept. 16, 1964, Ser. No. 396,902
2 Claims. (Cl. 100—133)

This invention relates to new and useful improvements in a sliced fruit squeezer and is particularly adapted for use in connection with open containers such as cups, glasses and the like and for squeezing the juices of fruits in same.

An object of the invention is to provide a device of the character described having a sliding wedge to engage a sliced section of fruit to press the juice from said fruit.

Another object of the invention is to provide a device of the character described having a downwardly extending sharpened spike beneath the top cover of the body of said device on which a sliced fruit section may be impinged to position and space the sliced fruit section adjacent inner surfaces of the rear vertical wall of said body in horizontal alignment with the sliding wedge so that the wedge may engage said sliced fruit section and squeeze the juice therefrom.

A further object of the invention is to provide a device of the character described which has an opening at the bottom thereof so that juice squeezed from a sliced fruit section may be directed into a container therebelow that has an opened top.

A still further object of the invention is to provide a device of the character described having a body with vertical rear wall terminating in two projections to form downwardly opened circular groove therebetween to fit over the upper edge of a container to position the opening in the bottom of said body in alignment with the opening in said container so that the juice squeezed from a sliced fruit section by said horizontal sliding wedge engaging and pressing the sliced fruit section against the inner surfaces of the underside of the top and inside of the vertical rear wall of said body is directed downwardly into said container.

A still further object of the invention is to provide a device of the character described having a wedge with pin attached with the pin extending upwardly through an elongated slot in the top cover of a housing body with said slot extending lengthwise in the direction of the sliding movement of said wedge in said body whereby said pin may be moved manually to actuate the wedge rearwardly to squeeze the juice from sliced fruit section and actuated forwardly to release the section so that it may be removed from impingement on a sharpened spike extending downwardly from the underside of the top of said body.

Figure 1:
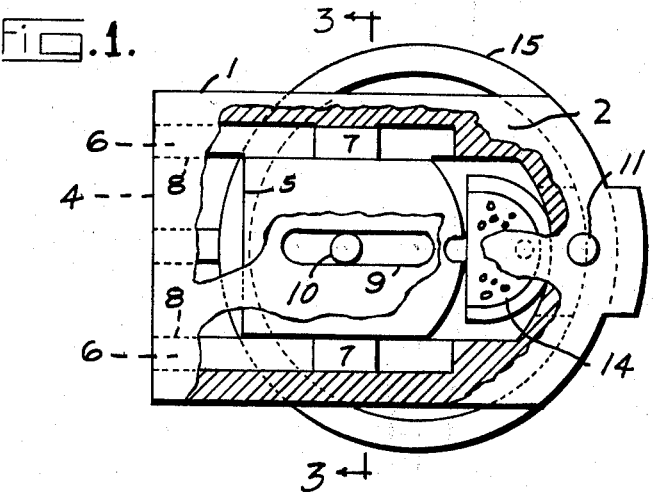
Figure 2:
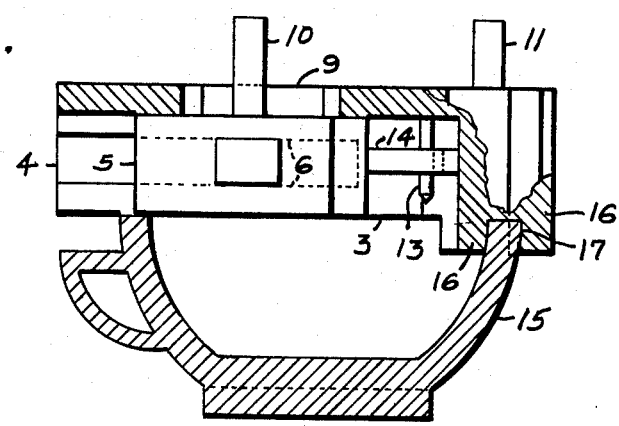
Figure 3:
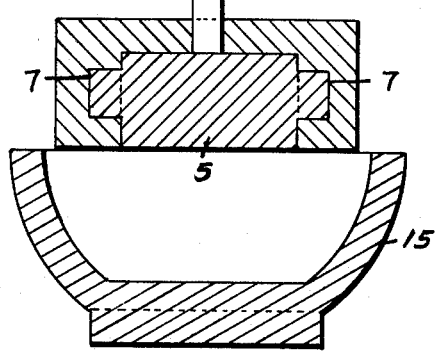

These and other objects of the invention are in part obvious and will in part be more fully disclosed in the specifications, one embodiment of which is illustrated in the accompanying drawings, in which:

FIG. 1 is a top view with top cover partly sectional;
FIG. 2 is a side view partly sectional; and,
FIG. 3 is a sectional view taken on the line 3—3 of FIG. 1.

The invention will be better understood from a detailed description thereof reference being had to the accompanying drawings in which like numeraled parts herein denote like numeraled parts therein. The numeral 1 denotes the housing body of the device having covering top 2 and open bottom 3 with the front end 4 of said body being open to permit the tongues 7—7 of the wedge 5 to travel rearward in opposed grooves 6—6 in the inner side walls 8—8 of said body 1 to squeeze the juice from a section of sliced fruit indicated at 14 and to travel forward to release a squeezed section of sliced fruit which may be impinged on sharpened spike 13. An elongated slot 9 is provided through the cover top 2 of said body 1 to permit the pin 10 to travel rearward and forward in said slot 9 to actuate the wedge 5 when the pin 10 is manipulated manually.

By pressing the pin 10 rearward with index finger and the thumb holding behind the pin 11 which is attached to the rear of body 1 the wedge is actuated rearwardly. By placing the index finger inside the pin 10 and the thumb inside the pin 11 the pin 10 may be moved forward by the index finger in a spreading action carrying the wedge 5 therewith to release a section of sliced fruit impaled on sharpened spike 13 from its squeezed and compressed state after having been squeezed between the rear end of the wedge 5 and the inner surfaces of the cover top 2 and inside of the rear vertical wall 12 of the body 1. After squeezing a section of sliced fruit the juice therefrom falls into a container below such as cup 15 and then the sliced fruit section may be easily removed from the sharpened spike 13 and repetition of the squeezing and releasing procedure employed again when needed.

Two circular opposed projections 16—16 extend downwardly from the bottom of rear wall 12 of the body 1 to form a circular groove 17, which groove 17 is provided to fit over the top edge of an open container such as cup 15 shown. Thus, the body 1 is stabilized on the top of the container 15 by the circular groove 17 fitting over the top edge of the container cup 15 and assures the alignment of the body 1 superimposed over the open top thereof so that the juice squeezed from a section of sliced fruit will be directed downwardly into said container since the bottom 18 of the body 1 is open and the top 19 of the container 15 is open to allow the inner surfaces of rear wall 12 inside of the opening 19 in the top of said container cup 15 to positively direct the squeezed juice downwardly into said container 15.

It is obvious that many changes may be made in the details of construction and arrangement of the parts without departing from the spirit and scope of the invention.

What I claim as new and desire to secure by Letters Patent, is:

1. In a fruit squeezer, a body housing open on the front end and closed on the rear end with a closed top and open bottom and having horizontal opposed grooves on the inner side walls of said body extending from the front open end toward the closed rear end thereof, an elongated slot in the top of said body, a wedge disposed in said grooves for free movement from the front end of said body toward the rear end thereof with a vertical pin extending upwardly through said slot in the top of said body whereby said wedge may be actuated rearward and forward in said grooves by manipulating said pin attached to said wedge, a sharpened spike attached to the underside of the top of said body and located adjacent the rear end of said body for receiving a sliced fruit section for impingement thereon whereby a rearward movement of said wedge will engage and squeeze said sliced fruit section.

2. In a fruit squeezer, a body housing open on the front end and closed on the rear end with a closed top and open bottom and having horizontal opposed grooves on the inner side walls of said body extending from the front open end toward the closed rear end thereof, an elongated slot in the top of said body, a wedge disposed in said grooves for free movement from the front end of said body toward the rear end thereof with a vertical pin extending upwardly through said slot in the top of said body whereby said wedge may be actuated rearward and forward in said grooves by manipulating said pin attached to said wedge, a sharpened spike attached to the underside of the top of said body and located adjacent the rear end of said body for receiving a sliced fruit section for impingement thereon whereby a rearward movement of said wedge will engage and squeeze said sliced fruit section, the rear end of said body having a rear vertical wall terminating in two downwardly depending projections providing an opened circular groove between said projections, said circular groove adapted to fit the upper edge of a container having an open top to permit the juice squeezed from a section of fruit impinged on said spike to discharge the juice thereof through the open bottom of said body and down the inner surfaces of said rear wall into said container.

References Cited by the Examiner
UNITED STATES PATENTS

| | | | |
|---|---|---|---|
| 1,422,196 | 7/1922 | Gray | 100—131 X |
| 1,446,558 | 2/1923 | Gray | 100—234 X |
| 1,809,410 | 6/1931 | Gross | 100—235 X |
| 1,996,970 | 4/1935 | Morris | 100—133 |

WALTER A. SCHEEL, *Primary Examiner.*